(12) United States Patent
Kim (10) Patent No.: US 6,281,943 B1
(45) Date of Patent: Aug. 28, 2001

(54) CUT-OFF CONTROL CIRCUIT FOR ADJUSTING WHITE BALANCE

(75) Inventor: Yong-Sub Kim, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/071,329

(22) Filed: Apr. 30, 1998

(30) Foreign Application Priority Data

Apr. 30, 1997 (KR) ................................. 97-16811

(51) Int. Cl.[7] ............... H04N 9/73; H04N 5/18; H04N 5/57
(52) U.S. Cl. ............ 348/656; 348/687; 348/689; 348/706; 348/707
(58) Field of Search ..................... 348/656, 655, 348/658, 687, 689, 705, 706, 707; H04N 9/73, 5/57, 5/18, 5/268, 5/14

(56) References Cited

U.S. PATENT DOCUMENTS 5,304,946 * 4/1994 Sano ..................................... 348/707
5,452,020 * 9/1995 White ................................... 348/687
5,726,540 * 3/1998 Klink ................................... 315/383

* cited by examiner

Primary Examiner—Sherrie Hsia
(74) Attorney, Agent, or Firm—Skjerven Morrill MacPherson LLP; David W. Heid

(57) ABSTRACT

Cut-off control circuits implementing DC-coupling and AC-coupling to CRT cathodes can employ the same preamplifier integrated circuits with few additional components. The preamplifier includes a switching unit for receiving control data, generating a control signal according to control data, and outputting the control signal internally or externally. The switching unit provides a control signal internally to an amplification circuit, when the preamplifier operates in a cut-off control circuit having a DC-coupling to a CRT. With a DC coupling the amplification circuit controls a DC bias applied to a CRT cathode. The switching unit provides a bus control signal externally to a bias circuit, when the preamplifier operates in a cut-off control circuit having an AC-coupling to a CRT.

41 Claims, 8 Drawing Sheets

CUT-OFF CONTROL CIRCUIT FOR ADJUSTING WHITE BALANCE

BACKGROUND

1. Field of the Invention

The present invention relates to video display devices, and more particularly, to amplifiers and cut-off control circuits for adjusting the white balance of display devices.

2. Description of the Related Art

In a display device such as a monitor, a white balance adjustment makes a white object appear white regardless of the color temperature. In particular, in a cathode ray tube (CRT), a white balance adjustment adjusts gains and biases of signals applied to red, green, and blue (RGB) guns or cathodes in the CRT. The bias adjustment is often referred to as a cut-off adjustment. Cut-off control circuits can employ a DC-coupling or an AC-coupling when driving cathodes of a CRT. The coupling mode of the cut-off control circuit does not affect the gain adjustment since the gain controls an AC signal component that both AC and DC couplings transfer. However, the coupling mode does affect the bias adjustment, and cut-off control circuits typically require different integrated circuit chips according to the type coupling employed. A further concern is that brightness control depends on a combined RGB signal, but the cut-off control, which controls cathode biases, is carried out for each of the R, G, and B signals separately. In order to adjust the white balance, the brightness level is adjusted first, and then the cut-off control is performed.

Figure 1A:
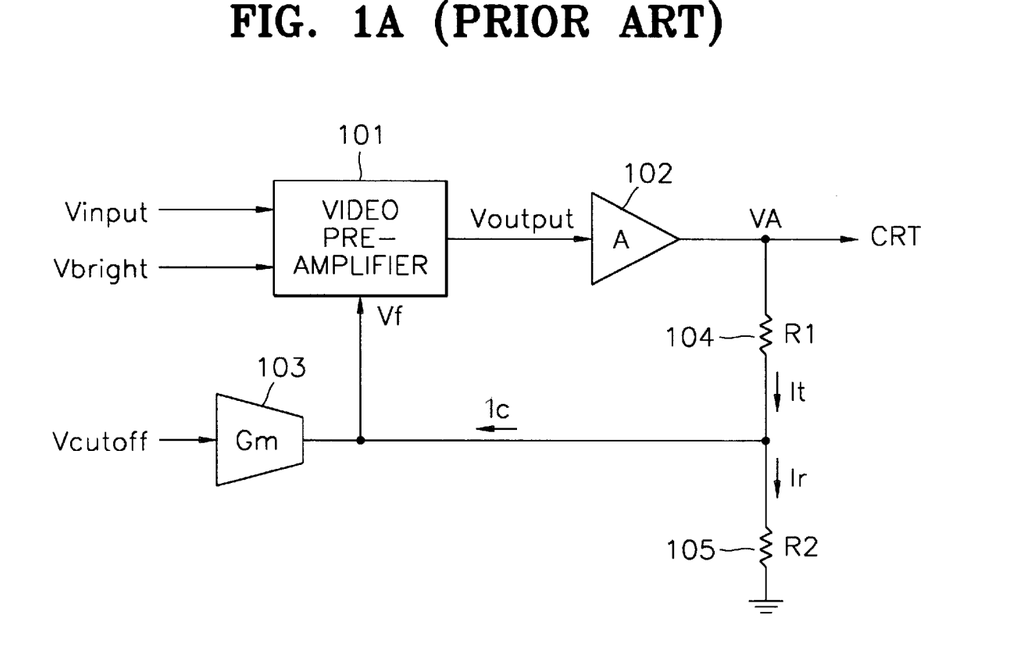
FIG. 1A illustrates a conventional cut-off control circuit using a DC-coupling.

FIG. 1A is a circuit diagram of a conventional cut-off control circuit having a DC-coupling to the video portion of a monitor (e.g., a cathode in a CRT). The cut-off control circuit of FIG. 1A includes a video pre-amplifier 101 and a drive amplifier 102 for driving a CRT. For simplicity, FIG. 1A shows only one channel even though a color video system normally has three channels (R, G, and B). The cut-off control adjusts the respective CRT cathode bias voltages VA for the R, G, and B cathodes. In FIG. 1A, a video feedback voltage Vf provides a negative feedback to pre-amplifier 101. Pre-amplifier 101 controls an output voltage Voutput so that video feedback voltage Vf is the same as or depends on a brightness control voltage Vbright. A current controller 103 controls video feedback voltage Vf and thus controls voltage Voutput and CRT cathode bias voltage VA. Equation 1 expresses CRT cathode bias voltage VA as a function of feedback voltage Vf, resistances R1 and R2 of respective resistors 104 and 105, and a current Ic.

$$VA = Vf * \frac{R1 + R2}{R2} + Ic * R1 \qquad \text{Equation 1:}$$

As can be seen in Equation 1, the CRT cathode bias voltage VA depends on the control current Ic, which a cut-off control signal Vcutoff can adjust.

Figure 1B:
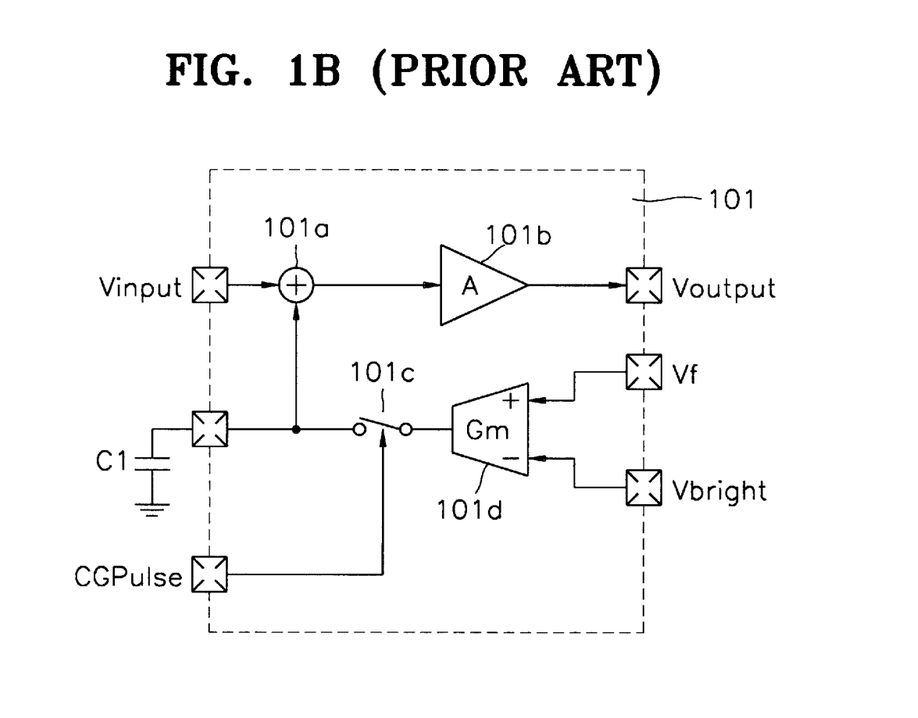
FIG. 1B is a circuit diagram of a video pre-amplifier shown in FIG. 1A.

FIG. 1B is a circuit diagram of the conventional video pre-amplifier 101 shown in FIG. 1A, in which an external feedback brightness control method is used. Referring to FIG. 1B, the video pre-amplifier 101 includes an adder 110a, a drive amplifier 101b, a comparator 101d, and a switch 101c.

Figure 2A:
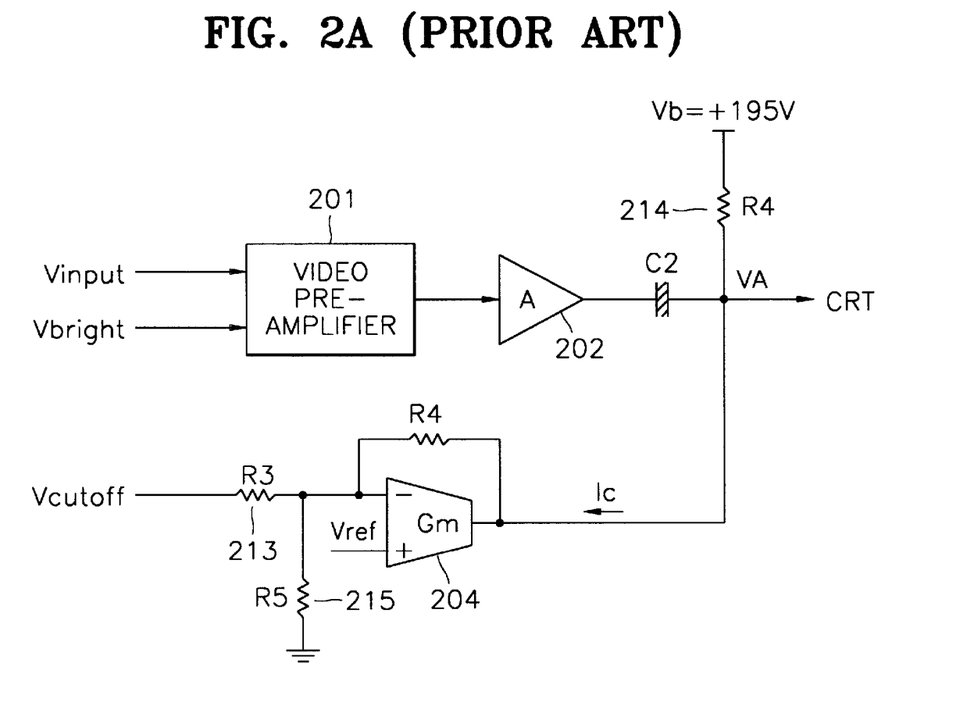
FIG. 2A illustrates a conventional cut-off control circuit using a AC-coupling.

FIG. 2A is a circuit diagram of a conventional cut-off control circuit using an AC-coupling mode. The cut-off control circuit of FIG. 2A includes a video pre-amplifier 201, a drive amplifier 202, a coupling capacitor 203, and a comparator 204. This circuit uses a separate DC bias circuit that controls cathode bias voltage VA. Only an AC component of the output signal from drive amplifier 202 passes through a coupling capacitor 203 to voltage VA. Equation 2 expresses cathode bias voltage VA as a function of a reference voltage Vref, resistances R3, R4, and R5 of respective resistors 213, 214, and 215, and cutoff voltage Vcutoff.

$$VA = Vref * \frac{R3 + R4 + R5}{R3 * R5} - Vcutoff * \frac{R4}{R5} \qquad \text{Equation 2:}$$

As shown in the equation 2, cathode bias voltage VA depends on cut-off control voltage Vcutoff which is applied to a comparator 204 to adjusts a control current Ic.

Figure 2B:
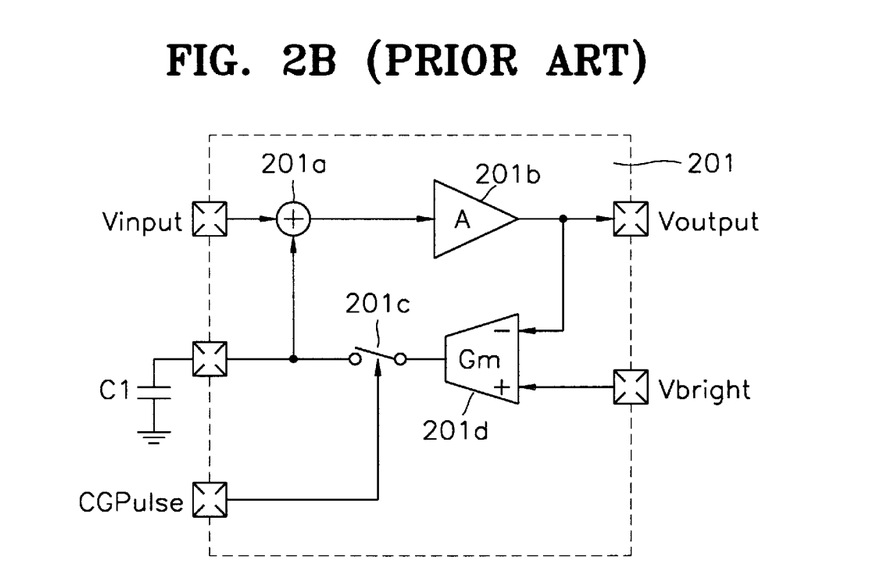
FIG. 2B is a circuit diagram of a video pre-amplifier shown in FIG. 2A.

FIG. 2B is a circuit diagram of video preamplifier 201 shown in FIG. 2A, in which a built-in feedback brightness controlling method is used. The video pre-amplifier 201 of FIG. 2B includes an adder 201a, a drive amplifier 201b, a comparator 201d, and a switch 201c.

As mentioned above, the video pre-amplifiers 101 and 201 of the conventional cut-off control circuits respectively using DC-coupling and AC-coupling differ from each other. Thus, conventional cut-off control circuits using different coupling modes require different integrated circuits and external parts. Further, the cut-off control circuits require a number of external parts, such as an operational amplifier and resistors, in addition to the video pre-amplifier. This makes the circuits more complex.

SUMMARY OF THE INVENTION

An object of the present invention is to provide a video pre-amplifier that can be implemented on a single IC chip and can be used in cut-off control circuits using both AC-coupling mode and DC-coupling mode. Another object of the invention is to provide a cut-off control circuit that requires fewer external components other than a video pre-amplifier IC chip.

To achieve the above objects, a preamplifier according to an embodiment of the invention includes a switching unit for receiving control data, generating a bus control signal according to the control data, and outputting the bus control signal internally or externally. The switching unit provides a bus control signal internally, when the preamplifier operates in a cut-off control circuit that uses DC-coupling. The switching unit provides a bus control signal to an external bias circuit when the preamplifier operates in a cut-off control circuit that uses AC-coupling.

BRIEF DESCRIPTION OF THE DRAWINGS

The above object and advantages of the present invention will become more apparent by describing in detail a preferred embodiment thereof with reference to the attached drawings in which.

Use of the same reference symbols in different figures indicates similar or identical items.

DESCRIPTION OF THE PREFERRED EMBODIMENTS

Figure 3:
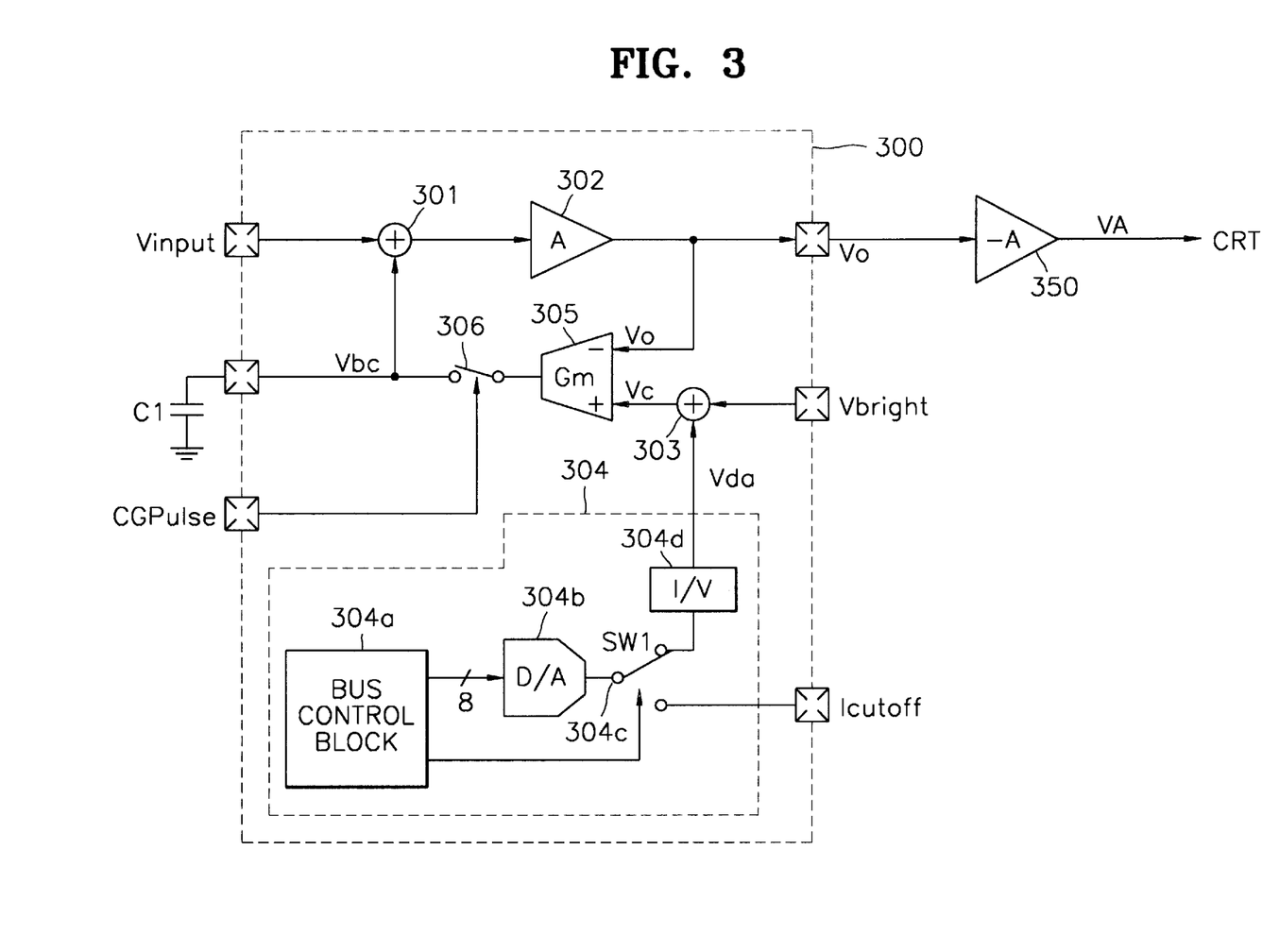
FIG. 3 illustrates a cut-off control circuit with a DC-coupling and a video amplifier of a preferred embodiment according to the present invention.
Figure 4:
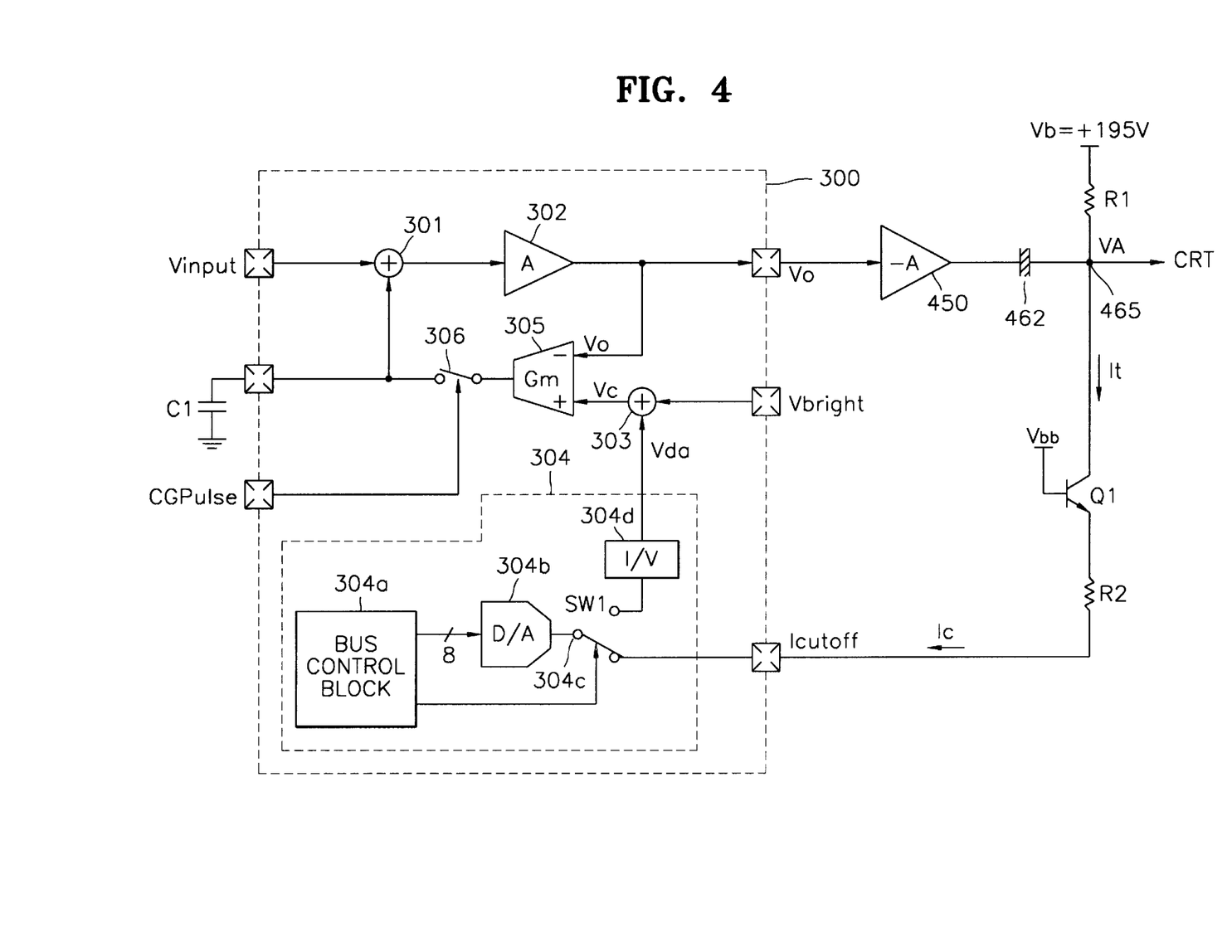
FIG. 4 illustrates a cut-off control circuit with an AC-coupling and the video amplifier from FIG. 3.

FIG. 3 shows a cut-off control circuit in accordance with an embodiment of the invention. The cut-off control circuit includes a video pre-amplifier 300 and a drive amplifier 350 that uses a DC-coupling to a cathode of a cathode ray tube (CRT), not shown. In accordance with an aspect of the invention, video pre-amplifier 300 can be formed on an integrated circuit (IC) chip and employed in a cut-off circuit using either a DC coupling (as shown in FIG. 3) or an AC coupling (as shown in FIG. 4 and described below). In FIG. 3, video pre-amplifier 300 amplifies a sum of a video input signal Vinput and a bias control voltage Vbc and applies an amplified output signal Vo to drive amplifier 350. Drive amplifier 350 amplifies signal Vo and drives the CRT in the video system. Video pre-amplifier 300 includes a first adder 301, an amplifier 302, a second adder 303, a switching unit 304, an analog comparator 305, and a clamping switch (or transistor) 306. Switching unit 304 includes a bus control block 304a, a digital-to-analog (D/A) converter 304b, a switch 304c, and an I/V converter 304d.

Adders 301 and 303 add analog voltages. In operation, adder 301 adds video input signal Vinput to bias control signal Vbc and applies the resultant sum to amplifier 302. Amplifier 302 amplifies signal output from adder 301, and outputs the amplified signal as video output signal Vo from video-preamplifier 300. Adder 303 adds an output signal Vda from switching unit 304 to a brightness control signal Vbright and applies the resultant signal Vc to an input terminal of comparator 305. A microcontroller (not shown) or an on-screen display (OSD) controller (not shown) in the video system generates brightness control signal Vbright to indicate a desired brightness of the CRT image. Comparator 305 compares signal Vc from second adder 303 with video output signal Vo from amplifier 302 and generates an output signal having a level that depends on the difference between signal Vc and video output signal Vo. Clamping switch 306 closes or opens in response to pulses in a signal CGPulse from the microcontroller and connects or disconnects the output signal from comparator 305 to adder 301 and a capacitor C1. The signal CGPulse is activated during a back porch period of the video input signal. Capacitor C1 is typically external to a pre-amplifier integrate circuit 300. When switch 306 is closed, comparator 305 charges (or discharges) capacitor C1 by drawing or supplying a current to capacitor C1 depending on the compared result. The voltage difference across capacitor C1 is provided as the bias control signal Vbc to the adder 301. Due to the operation of the feedback loop, signal Vbc reaches such a voltage that signals Vo and Vc have equal magnitude. When switch 306 is open, capacitor C1 clamps or holds signal Vbc at a nearly constant voltage. In particular, capacitor C1 limits an AC component of bias control voltage Vbc which may result from the AC component of signal Vo.

In switching unit 304, bus control block 304a receives serial control data from the microcontroller via an inter-IC bus (IIC bus) and stores such data in an internal register for output as a parallel signal. (For example, 8-bit parallel data signals indicating a cut-off level for an R, G, or B cathode in the CRT.) A digital-to-analog (D/A) converter 304b receives the bus control data from bus control block 304a and converts the bus control data into an analog control current signal. Switch 304c transfers the control current signal from D/A converter 304b either to current-to-voltage (I/V) converter 304d or to the terminal for cut-off signal Icutoff depending on a selection control signal from bus control block 304a. Here, the control current signal is negative, i.e., D/A converter 304b draws current from either I/V converter 304d or the Icutoff terminal. When I/V converter 304d receives the control current signal, converter 304d converts the current signal into control voltage signal Vda. The microcontroller can provide the selection control signal with a value that indicates the type of coupling used in the cut-off control circuit. In FIG. 3, the cut-off control circuit uses a DC coupling to the CRT, and switching unit 304 operates in a mode referred to herein as DC-coupling mode or internal mode where switch 304c provides a path from D/A converter 304b to IN converter 304d.

For control of the bias voltage using a DC coupling, comparator 305 (or charged capacitor C1), adder 301, and amplifier 302 form a negative feedback loop which sets the steady state or DC level of voltage Vo equal to control voltage Vc. Equation 3 shows the relationship of the DC component of video output voltage Vo to signals Vc, Vbright, and Vda.

$$Vo = Vc = Vbright + Vda. \qquad \text{Equation 3:}$$

Signals Vbright, Vda, and Vc respectively denote a brightness control voltage, the output voltage of switching unit 304, and the output voltage of second adder 303. Sequential conversion of data from bus control block 304a can change voltage Vda to perform the cut-off control for each of the RGB cathodes and therefore change output voltage Vo to appropriate values for each of the RGB cathodes.

FIG. 4 shows a cut-off control circuit employing pre-amplifier 300 and a drive amplifier 450 with an AC-coupling to the video system. The configuration of video pre-amplifier 300 in FIG. 4 differs from the corresponding configuration in FIG. 3 in that switching unit 304 operates in an AC-coupling mode. In particular, switch 304c routes the control current signal from D/A converter 304b to an output terminal for cut-off signal Icutoff. To implement the AC coupling, the cut-off circuit of FIG. 4 includes a capacitor 462 coupled between drive amplifier 450 and an output node 465. Amplifier 450 provides an AC video signal to node 465. A DC bias circuit for node 465 includes resistors R1 and R2 and a transistor Q1. Resistor R1 is between node 465 and a supply voltage Vb. Transistor Q1 has a collector connected to node 465, a base connected to a bias voltage Vbb, and an emitter connected via resistor R2 to switching unit 304.

When switch 304c routes the control current signal to the output terminal for signal Icutoff, the DC voltage to the second terminal of adder 303 is zero. The feedback loop including comparator 305 or capacitor C1, adder 301, and amplifier 302 still drives output voltage Vo to the level of control voltage Vc. Accordingly, Equations 4 express the steady state or DC component of video output voltage Vo and CRT cathode bias VA.

$$Vo = Vbright$$

$$VA = Vb - R1 * Ic \qquad \text{Equations 4:}$$

In Equations 4, Vbright, Ic, and Vb respectively denote a brightness control voltage, the magnitude of the output current from D/A converter 304b, and a supply voltage. As can be seen from Equations 4, D/A converter 304b by controlling voltage Vda controls the DC component of CRT bias voltage VA.

Figure 5:
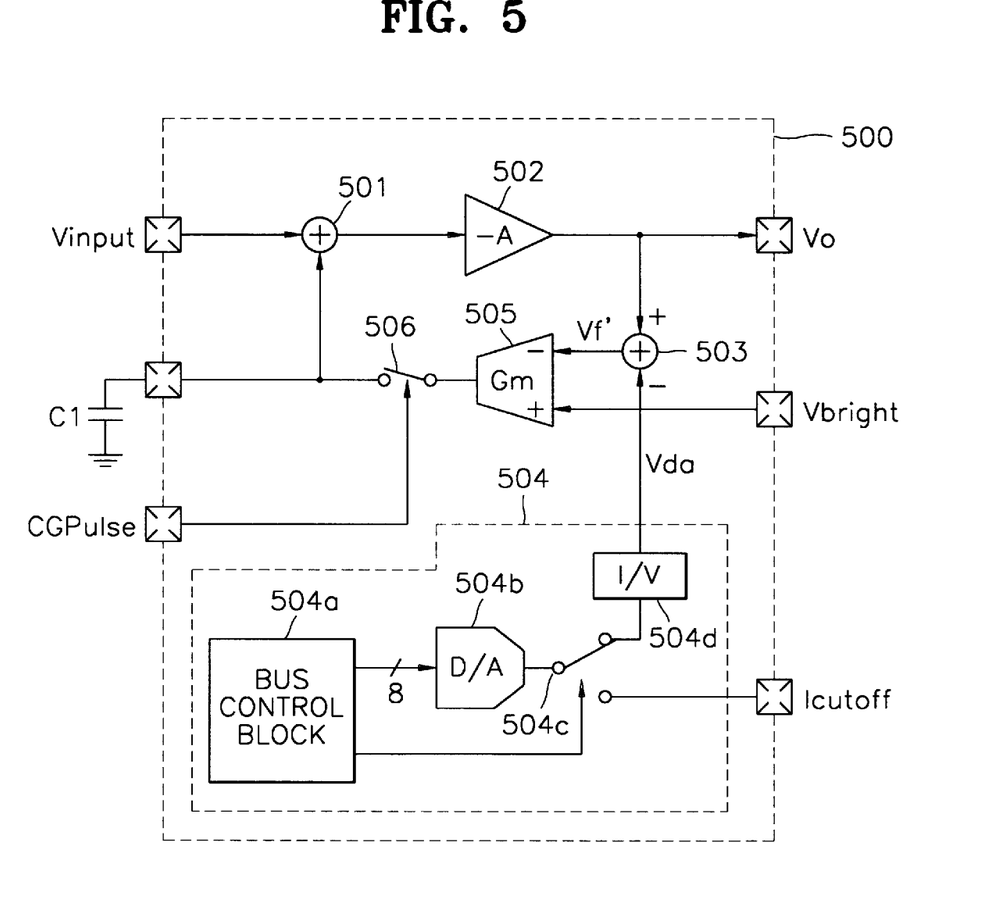
FIG. 5 is a circuit diagram of another embodiment of the video pre-amplifier according to the present invention.

FIG. 5 illustrates a video pre-amplifier 500 in accordance with another embodiment of the invention. Video pre-amplifier 500 includes a first adder 501, an amplifier 502, a second adder 503, a switching unit 504, a comparator 505, and a clamping switch 506 which are respectively similar or identical to first adder 301, amplifier 302, second adder 303, a switching unit 304, comparator 305, and clamping switch 306 of FIG. 3. A primary difference between pre-amplifier 300 of FIG. 3 and pre-amplifier 500 of FIG. 5 is that second adder 503 has a positive input terminal coupled to the output terminal of amplifier 502 and a negative input terminal coupled to the output terminal of switching unit 504. An output voltage Vf from adder 503 is thus equal to output voltage Vo minus the voltage from switching unit 504.

Cut-off control circuits using DC-coupling and AC-coupling, similar to those of FIGS. 3 and 4 can use pre-amplifier 500 in place of pre-amplifier 300. In a DC coupling mode of pre-amplifier 500, a negative feedback loop including comparator 505 (or charged capacitor C1), adder 501, amplifier 502, and adder 503 drives voltage Vf to an equilibrium level equal to brightness control voltage Vbright. Accordingly, in DC coupling mode, Equation 5 gives output voltage Vo in terms of voltages Vbright and Vda.

$$Vo-Vda=Vbright \text{ or } Vo=Vbright+Vda \quad \text{Equation 5:}$$

In AC coupling mode, switching circuit 504 grounds the negative input to adder 503, and output voltage Vo is the same as for pre-amplifier 300 in FIG. 4.

Figure 6:
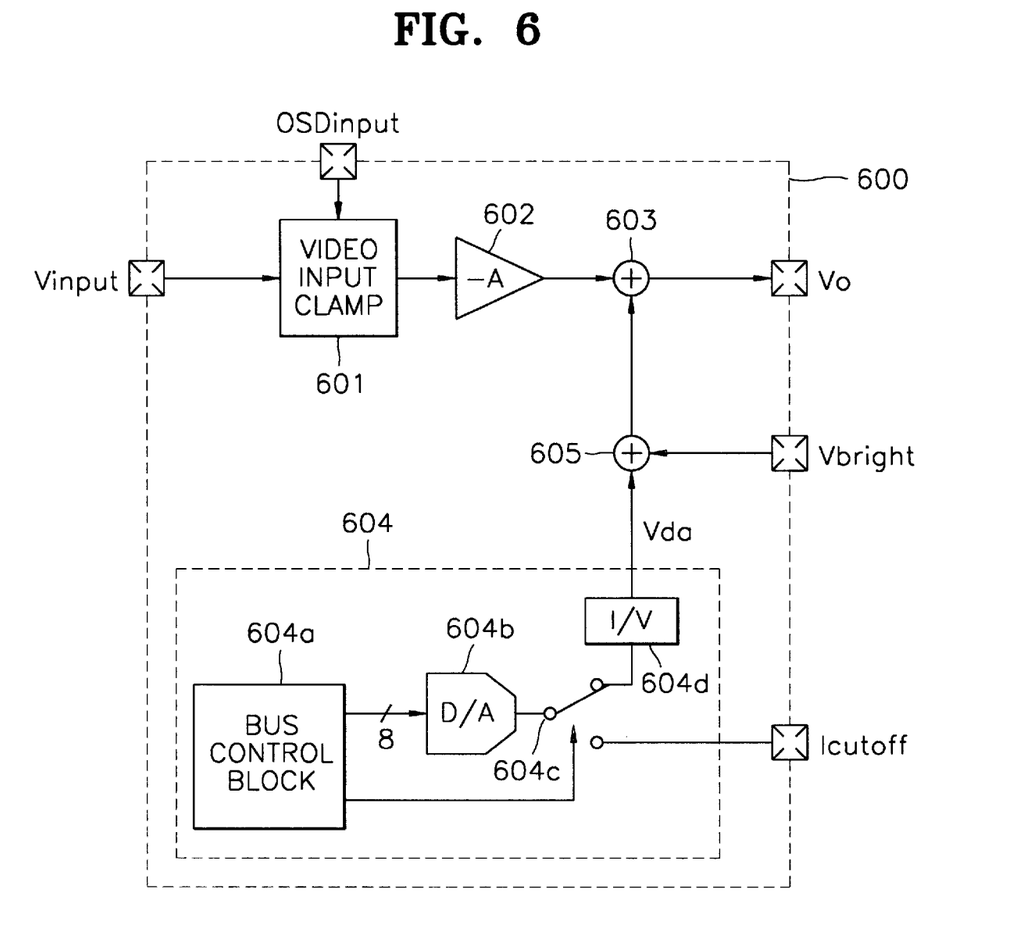
FIG. 6 is a circuit diagram of yet another embodiment of the video pre-amplifier according to the present invention.

FIG. 6 illustrates a video preamplifier 600 in accordance with yet another embodiment of the invention. Pre-amplifier 600 of FIG. 6 can replace pre-amplifier 300 in cut-off control circuits using DC-coupling and AC-coupling, similar to those of FIGS. 3 and 4.

In FIG. 6, video pre-amplifier 600 includes a video input clamping unit 601, an amplifier 602, a first adder 603, a switching unit 604, and a second adder 605. Switching unit 604 includes a bus control block 604a, a digital-to-analog (D/A) converter 604b, a switch 604c, and an I/V converter 604d. Video input clamping unit 601, which is optional, receives a video input signal Vinput and an OSD signal from an OSD controller (not shown) and matches the black level of video input signal Vinput to that of the OSD signal. Video input clamping unit 601 applies a level-adjust video input signal to amplifier 602 for amplification.

In switching unit 604, D/A converter 604b receives digital bus control data from bus control block 604a and converts that data into an analog control current signal. Switch 604c directs the analog control current signal from D/A converter 604b either to I/V converter 604d or to the output terminal for cut-off signal Icutoff according to a selection control signal from bus control block 604a. When I/V converter 604d receives the control current signal, converter 604d converts the current signal into control voltage signal Vda. Second adder 605 adds the output signal VDA from switching unit 604 to brightness control signal Vbright. First adder 603 adds the output signal from amplifier 602 to the output signal of second adder 605 and outputs the sum as video output signal Vo. Accordingly, in DC coupling mode, adder 603 shifts the DC component of output from amplifier 602 by the sum of signals Vbright and Vda.

Figure 7A:
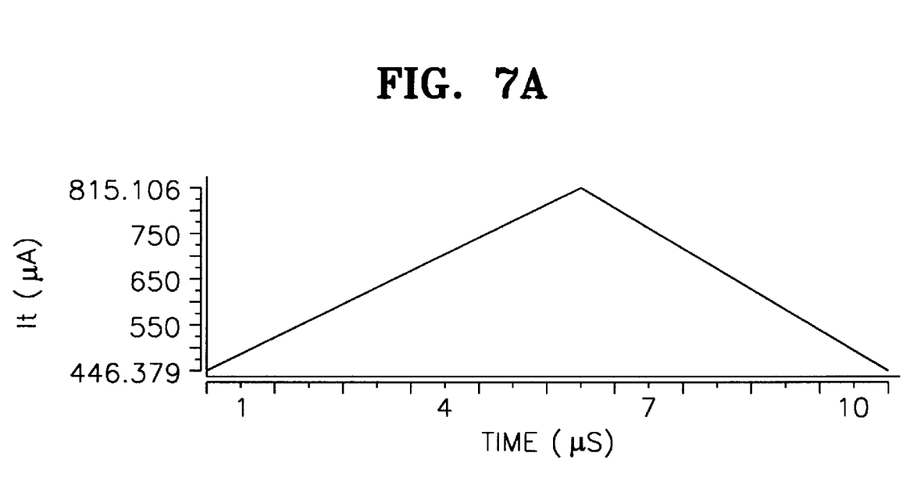
FIGS. 7A through 7C are graphs showing simulated performance of a cut-off control circuit according to the present invention.
Figure 7B:
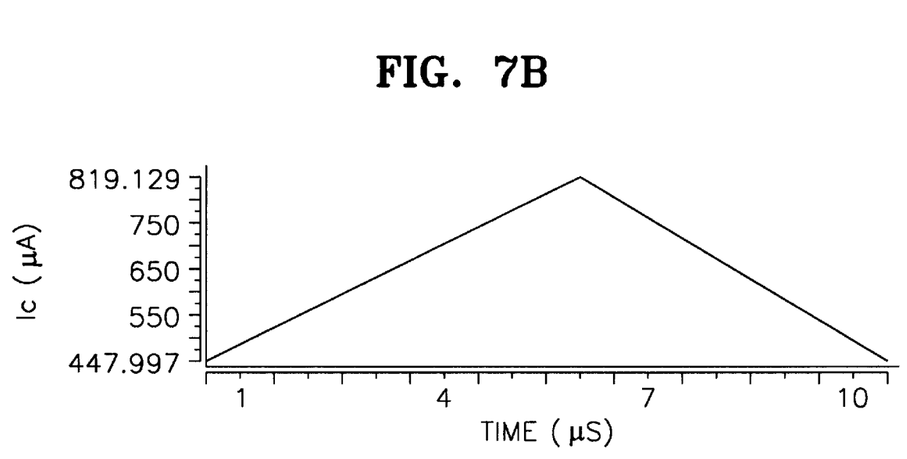
Figure 7C:
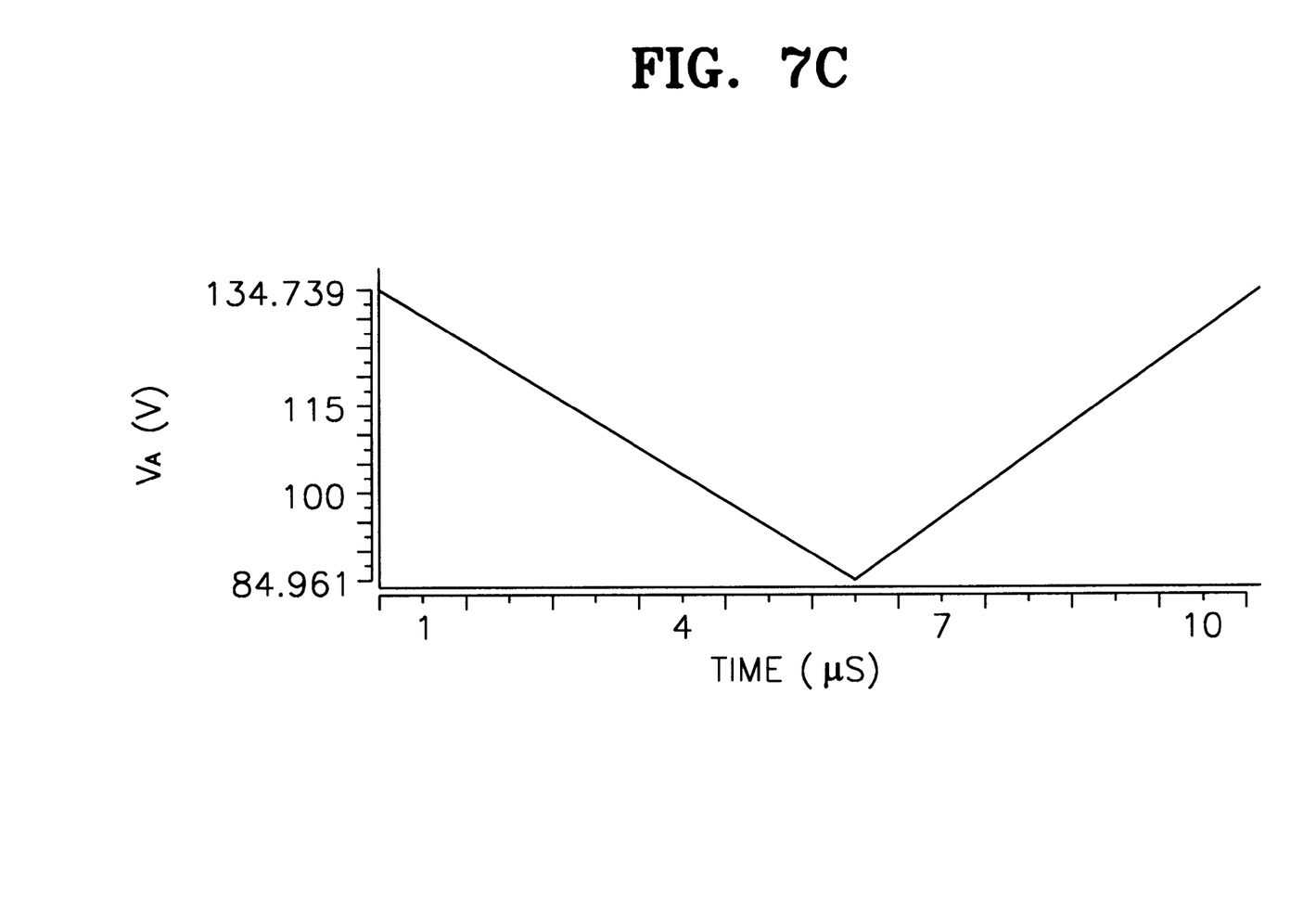

FIGS. 7A through 7C show plots of the results of a simulation of the circuit of FIG. 4. In the simulation, the bus control data from bus control block 404a sweeps from 00h to FFh and then to 00h again. FIGS. 7A and 7B respectively show the waveforms of a collector current It and an emitter current Ic of transistor Q1. FIG. 7C shows the waveform of the DC component of output voltage VA, which is output to a CRT cathode. As can be seen in FIG. 7C, the DC bias of the output voltage VA varies across a range according to the bus control data. Therefore, the bus control data can set the DC bias of output voltage VA as required within the range. Further, a specific value of the bus control data can be easily selected and set during manufacture.

As described above, the pre-amplifier includes a built-in bus control block and D/A converter that is usable in the cut-off control circuits using both DC-coupling and AC-coupling. The chip size of the pre-amplifier is not greatly increased for this added flexibility since separate sets of control blocks and D/A converters, one for DC-coupling mode and one for AC-coupling, are not required. Instead, a switch selects the operating mode and use of the control block and D/A converter. Furthermore, in either a control circuit employing DC or AC coupling, the number of required components in addition to the video pre-amplifier IC chip is low, which lowers manufacturing cost of the cut-off control circuits.

In alternative embodiments of the present invention where only DC-coupling or only AC coupling is required, switch 304c, 504c, or 604c may be omitted from in the respective pre-amplifier 300, 500, or 600. In such embodiments, the output signal of the D/A converter 304b, 504b, or 604b is provided directly to either the I/V converter or the Icutoff terminal depending on the coupling mode for the pre-amplifier 300, 500, or 600. When the pre-amplifier is employed in a DC coupled cut-off control circuit, adder 303, 503, or 605, which is used adding the output signal of the switching unit to the video output signal Vo or the brightness control signal Vbright, may be omitted.

Having described and illustrated principles of the invention in specific embodiments, it should be apparent that the invention can be modified in arrangement and detail without departing from such principles. We claim all modifications and variation coming within the spirit and scope of the following claims.

What is claimed is:

1. A video pre-amplifier for use in a cut-off control circuit, comprising:
   a first adder for adding a video input signal to a clamping signal;
   an amplifier for receiving an output signal of the first adder and amplifying such signal to generate an amplified signal as a video output signal;
   a second adder for adding a first control signal to a brightness control signal;
   a comparator for comparing an output signal of the second adder with the video output signal from the amplifier and outputting a compared result as the clamping signal; and
   a switch circuit for receiving control data and generating a bus control signal according to the control data;
   wherein, the switch circuit outputs the bus control signal as the first control signal, or outputs a zero value as the first control signal and the bus control signal as a second control signal.

2. The video pre-amplifier of claim 1, further comprising:
   a switch operating in response to a clamping gate pulse signal; and
   a capacitor having a first terminal connected to the comparator via the switch and a second terminal connected to ground, wherein the capacitor is charged by the comparator when the switch is turned on and maintains a charged level when the switch is turned off to provide the charged level as the clamping signal.

3. The video pre-amplifier of claim 1, wherein the switch circuit comprises:
   a bus control unit for receiving the control data and generating bus control data and a switching control signal;
   a digital-to-analog converter for converting the bus control data into the bus control signal; and
   a switch having a first configuration where the bus control signal is output as the first control signal, and a second configuration where the first control signal has a zero value and the bus control signal is output as the second control signal, the switching control signal selecting one of the first and second configurations for the switch.

4. A video pre-amplifier for use in a cut-off control circuit, comprising:
   a first adder for adding a video input signal to a clamping signal;
   an amplifier that amplifies an output signal of the first adder to generate an amplified signal as a video output signal;
   a second adder for adding a first control signal to the video output signal from the amplifier;
   a comparator that compares an output signal of the second adder with a brightness control signal and generates a compared result as the clamping signal; and
   a switch circuit for receiving control data and generating a bus control signal according to the control data;
   wherein, the switch circuit outputs the bus control signal as the first control signal, or outputs zero value as the first control signal and the bus control signal as a second control signal.

5. The video pre-amplifier of claim 4, further comprising:
   a switch operating in response to a clamping gate pulse signal; and
   a capacitor having a first terminal connected to the comparator via the switch and a second terminal connected to ground,
   wherein the capacitor is charged by the comparator when the switch is turned on and maintains a charged level when the switch is turned off to provide the charged level as the clamping signal.

6. The video pre-amplifier of claim 4, wherein the switch circuit comprises:
   a bus control unit for receiving the control data and generating bus control data and a switching control signal;
   a digital-to-analog converter for converting the bus control data into the bus control signal; and
   a switch having a first configuration where the bus control signal is output as the first control signal, and a second configuration where the first control signal has a zero value and the bus control signal is output as the second control signal, the switching control signal selecting one of the first and second configurations for the switch.

7. A video pre-amplifier for use in a cut-off control circuit, comprising:
   an amplifier for receiving and amplifying a video input signal to generate an amplified signal;
   a switch circuit for receiving control data and generating a bus control signal according to the control data;
   a first adder for adding a first control signal to a brightness control signal; and
   a second adder for adding the amplified signal to an output signal of the first adder to output an added result as a video output signal;
   wherein, the switch circuit outputs the bus control signal as the first control signal, or outputs zero value as the first control signal and the bus control signal as a second control signal.

8. The video pre-amplifier of claim 7, wherein the switch circuit comprises:
   a bus control unit for receiving the control data and generating bus control data and a switching control signal;
   a digital-to-analog converter for converting the bus control data into the bus control signal; and
   a switch having a first configuration where the bus control signal is output as the first control signal, and a second configuration where the first control signal has a zero value and the bus control signal is output as the second control signal, the switching control signal selecting one of the first and second configurations for the switch.

9. The video pre-amplifier of claim 7, further comprising a video input clamp for receiving the video input signal and an OSD signal, matching a black level of the video input signal to a black level of the OSD signal, and outputting a black level matched signal so that the amplifier amplifies such signal.

10. A cut-off control circuit comprising:
    a video pre-amplifier that amplifies a video input signal to generate a video output signal; and
    a drive amplifier connected to amplify the video output signal from the video pre-amplifier to drive a CRT cathode,
    wherein the video pre-amplifier comprises:
    a first adder for adding the video input signal to a clamping signal;
    an amplifier for receiving an output signal of the first adder and amplifying such signal to output an amplified signal as the video output signal;
    a second adder for adding a first control signal to a brightness control signal;
    a comparator for comparing an output signal of the second adder with the video output signal from the amplifier and outputting a compared result as the clamping signal; and
    a switch circuit for receiving control data, generating a bus control signal according to the control data, and outputting the bus control signal as the first control signal.

11. The cut-off control circuit of claim 10, wherein the video pre-amplifier further comprises:
    a switch operating in response to a clamping gate pulse signal; and
    a capacitor having a first terminal connected to the comparator via the switch and a second terminal connected to ground,
    wherein the capacitor is charged by the comparator when the switch is turned on and maintains a charged level when the switch is turned off to provide the charged level as the clamping signal.

12. The cut-off control circuit of claim 10, wherein the switch circuit comprises:
a bus control unit for receiving the control data and generating bus control data and a switching control signal;
a digital-to-analog converter for converting the bus control data into the bus control signal; and
a switch having a first configuration where the bus control signal is output as the first control signal, and a second configuration where the first control signal has a zero value and the bus control signal is output as the second control signal, the switching control signal selecting one of the first and second configurations for the switch.

13. A cut-off control circuit comprising;
a video pre-amplifier that amplifies a video input signal to generate a video output signal; and
a drive amplifier connected to amplify the video output signal from the video pre-amplifier to drive a CRT cathode,
wherein the video pre-amplifier comprises:
a first adder for adding the video input signal to a clamping signal;
an amplifier for receiving an output signal of the first adder and amplifying such signal to output an amplified signal as the video output signal;
a second adder for adding a control signal to a brightness control signal;
a comparator for comparing an output signal of the second adder with the video output signal from the amplifier and outputting a compared result as the clamping signal; and
a control circuit for receiving control data and generating the control signal according to the control data.

14. A cut-off control circuit comprising;
a video pre-amplifier that amplifies a video input signal to generate a video output signal; and
a drive amplifier connected to amplify the video output signal from the video pre-amplifier to drive a CRT cathode,
wherein the video pre-amplifier comprises:
a first adder for adding the video input signal to a clamping signal;
an amplifier for receiving an output signal of the first adder and amplifying such signal to output an amplified signal as the video output signal;
a second adder for adding a first control signal to the video output signal from the amplifier;
a comparator for comparing an output signal of the second adder with a brightness control signal and outputting a compared result as the clamping signal; and
a switch circuit for receiving control data, generating a bus control signal according to the control data, and outputting the bus control signal as the first control signal.

15. The cut-off control circuit of claim 14, wherein the video pre-amplifier further comprises:
a switch operating in response to a clamping gate pulse signal; and
a capacitor having a first terminal connected to the comparator via the switch and a second terminal connected to ground,
wherein the capacitor is charged by the comparator when the switch is turned on and maintains a charged level when the switch is turned off to provide the charged level as the clamping signal.

16. The cut-off control circuit of claim 14, wherein the switch circuit comprises:
a bus control unit for receiving that receives the control data and generating bus control data and a switching control signal;
a digital-to-analog converter for converting the bus control data into the bus control signal; and
a switch for either outputting the bus control signal as the first control signal, or outputting zero value as the first control signal and the bus control signal as a second control signal, in response to the switching control signal.

17. A cut-off control circuit comprising:
a video pre-amplifier that amplifies a video input signal to generate a video output signal; and
a drive amplifier connected to amplify the video output signal from the video pre-amplifier to drive a CRT cathode,
wherein the video pre-amplifier comprises:
a first adder for adding the video input signal to a clamping signal:
an amplifier for receiving an output signal of the first adder and amplifying such signal to output an amplified signal as the video output signal;
a second adder for adding a control signal to the video output signal from the amplifier;
a comparator for comparing an output signal of the second adder with a brightness control signal and outputting a compared result as the clamping signal; and
a control circuit for receiving control data and generating the control signal according to the control data.

18. A cut-off control circuit comprising;
a video pre-amplifier that amplifies a video input signal to generate a video output signal; and
a drive amplifier connected to amplify the video output signal from the video pre-amplifier to drive a CRT cathode,
wherein the video pre-amplifier comprises:
an amplifier for receiving and amplifying the video input signal to output an amplified signal;
a switch circuit for receiving control data, generating a bus control signal according to the control data, and outputting the bus control signal as the first control signal;
a first adder for adding the first control signal to a brightness control signal; and
a second adder for adding the amplified signal to an output signal of the first adder to output an added result as the video output signal.

19. The cut-off control circuit of claim 18, wherein the switch circuit comprises:
a bus control unit for receiving the control data and generating bus control data and a switching control signal;
a digital-to-analog converter for converting the bus control data into the bus control signal; and
a switch having a first configuration where the bus control signal is output as the first control signal, and a second configuration where the first control signal has a zero value and the bus control signal is output as the second control signal, the switching control signal selecting one of the first and second configurations for the switch.

20. The cut-off control circuit of claim 18, further comprising a video input clamp for receiving the video input signal and an OSD signal, matching a black level of the video input signal to a black level of the OSD signal, and outputting a black level matched signal so that the amplifier amplifies such signal.

21. A cut-off control circuit comprising;
a video pre-amplifier that amplifies a video input signal to generate a video output signal; and
a drive amplifier connected to amplify the video output signal from the video pre-amplifier to drive a CRT cathode,
wherein the video pre-amplifier comprises:
an amplifier for receiving and amplifying the video input signal to output an amplified signal;
a control circuit for receiving control data and generating a control signal according to the control data;
a first adder for adding the control signal to a brightness control signal; and
a second adder for adding the amplified signal to an output signal of the first adder to output an added result as the video output signal.

22. A cut-off control circuit, comprising:
an output node;
a video pre-amplifier for amplifying a video input signal and outputting a video output signal;
a drive amplifier for amplifying the video output signal from the video pre-amplifier;
a first capacitor having a first terminal connected to an output of the drive amplifier and a second terminal connected to the output node;
a first resistor having a first terminal connected to a supply voltage and a second terminal connected to the second terminal of the first capacitor;
a transistor having a collector connected to the second terminal of the first resistor and a base connected to a bias voltage; and
a second resistor connected between the emitter of the transistor and a control terminal of the video pre-amplifier.

23. The cut-off control circuit of claim 22, wherein the video pre-amplifier comprises:
a first adder for adding the video input signal to a clamping signal;
an amplifier that amplifies an output signal of the first adder to generate an amplified signal as the video output signal;
a second adder for adding a first control signal to a brightness control signal;
a comparator that compares an output signal of the second adder with the video output signal from the amplifier and generates a compared result as the clamping signal; and
a switch circuit for receiving control data, generating a bus control signal according to the control data, and outputting zero value as the first control signal and the bus control signal as a second control signal to the emitter of the transistor.

24. The cut-off control circuit of claim 22, wherein the pre-amplifier further comprises:
a switch operating in response to a clamping gate pulse signal; and
a second capacitor having a first terminal connected to the comparator via the switch and a second terminal connected to ground,
wherein the second capacitor is charged by the comparator when the switch is turned on and maintains a charged level when the switch is turned off to provide the charged level as the clamping signal.

25. The cut-off control circuit of claim 23, wherein the switch circuit comprises:
a bus control unit for receiving the control data and generating bus control data and a switching control signal;
a digital-to-analog converter for converting the bus control data into the bus control signal; and
a switch for either outputting the bus control signal as the first control signal, or outputting zero value as the first control signal and the bus control signal as the second control signal to the emitter of the transistor.

26. The cut-off control circuit of claim 22, wherein the video pre-amplifier comprises:
an adder for adding the video input signal to a clamping signal;
an amplifier for receiving an output signal of the adder and amplifying such signal to output an amplified signal as the video output signal;
a comparator for comparing a brightness control signal with the video output signal from the amplifier and outputting a compared result as the clamping signal; and
a control circuit for receiving control data and generating a control signal according to the control data to output the control signal via the control terminal.

27. The cut-off control circuit of claim 22, wherein the video pre-amplifier comprises:
a first adder for adding the video input signal to a clamping signal;
an amplifier that amplifies an output signal of the first adder to generate an amplified signal as the video output signal;
a second adder for adding a first control signal to the video output signal from the amplifier;
a comparator for comparing an output signal of the second adder with a brightness control signal and outputting a compared result as the clamping signal; and
a switch circuit for receiving control data, generating a bus control signal according to the control data, and outputting zero value as the first control signal and the bus control signal as a second control signal to the emitter of the transistor.

28. The cut-off control circuit of claim 27, wherein the pre-amplifier further comprises:
a switch operating in response to a clamping gate pulse signal; and
a second capacitor having a first terminal connected to the comparator via the switch and a second terminal connected to ground,
wherein the second capacitor is charged by the comparator when the switch is turned on and maintains a charged level when the switch is turned off to provide the charged level as the clamping signal.

29. The cut-off control circuit of claim 27, wherein the switch circuit comprises:
a bus control unit for receiving the control data and generating bus control data and a switching control signal;
a digital-to-analog converter for converting the bus control data into the bus control signal; and a switch for either outputting the bus control signal as the first control signal, or outputting zero value as the first control signal and the bus control signal as a second control signal to the emitter of the transistor.

30. The cut-off control circuit of claim 22, wherein the video pre-amplifier comprises:

an adder for adding the video input signal to a clamping signal;

an amplifier for receiving an output signal of the adder and amplifying such signal to output an amplified signal as the video output signal;

a comparator for comparing the video output signal from the amplifier with a brightness control signal to output a compared result as the clamping signal; and a control circuit for receiving control data and generating a control signal according to the control data to output the control signal via the control terminal.

31. The cut-off control circuit of claim 22, wherein the video pre-amplifier comprises:

an amplifier for receiving and amplifying the video input signal to output an amplified signal;

a switch circuit for receiving control data and generating a first control signal according to the control data;

a first adder for adding the first control signal to a brightness control signal; and a second adder for adding the output signal of the first adder to an added result as the video output signal.

32. The cut-off control circuit of claim 31, wherein the switch circuit comprises:

a bus control unit for receiving the control data and generating bus control data and a switching control signal;

a digital-to-analog converter for converting the bus control data into a bus control signal; and a switch for either outputting the bus control signal as the first control signal, or outputting zero value as the first control signal and the bus control signal as a second control signal to the emitter of the transistor.

33. The cut-off control circuit of claim 31, further comprising a video input clamp for receiving the video input signal and an OSD signal, matching a black level of the video input signal to a black level of the OSD signal, and outputting a black level matched signal so that the amplifier amplifies such signal.

34. The cut-off control circuit of claim 22, wherein the video pre-amplifier comprises:

an amplifier for receiving and amplifying the video input signal to output an amplified signal;

an adder for adding the amplified signal to a brightness control signal; and a control circuit for receiving control data and generating a control signal according to the control data to output the control signal via the control terminal.

35. A method for generating a bias voltage for a video system, comprising:

connecting to the video system a cut-off control circuit that includes a pre-amplifier integrated circuit, the pre-amplifier integrated circuit comprising an amplification circuit and a switching unit;

generating a control signal that indicates the bias voltage for the video system; and configuring the switching unit according to whether the cut-off control circuit has an AC coupling or a DC coupling to the video system, wherein:

when configured for the DC coupling, the switching unit directs the control signal to the amplification circuit; and when configured for the AC coupling, the switching unit directs the control signal to a bias circuit.

36. The method of claim 35, wherein the pre-amplifier integrated circuit further comprises a data control block, and the method further comprises:

sending data to the data control block, the data including a control value; and generating the control signal from the control value.

37. The method of claim 36, wherein:

the data further include a mode selection value that indicates whether the cut-off control circuit connects to the video system via the AC coupling or the DC coupling; and configuring the switching unit comprises selecting a configuration based on the mode selection value.

38. The method of claim 35 wherein the amplification circuit generates an output signal from the pre-amplifier integrated circuit, and a voltage level of the output signal depends on a voltage applied to a control terminal of the amplification circuit.

39. The method of claim 38, wherein:

when configured for the DC coupling, the switching unit directs the control signal to the control terminal; and when configured for the AC coupling, the switching unit directs a zero valued signal to the control terminal.

40. The method of claim 35, wherein the cut-off control circuit connects to the video system via the DC coupling, and the amplification circuit selects for the bias voltage, a voltage level derived from the control signal.

41. The method of claim 35, wherein the cut-off control circuit connects to the video system via the AC coupling and includes the bias circuit which is external to the pre-amplifier integrated circuit, and the bias circuit selects for the bias voltage, a voltage level derived from the control signal.

* * * * *